(12) United States Patent
Cheng

(10) Patent No.: US 8,205,346 B1
(45) Date of Patent: Jun. 26, 2012

(54) QUASI-UNIAXIAL SOLAR TRAJECTORY TRACKING TRANSIT SYSTEM

(75) Inventor: Hong-Wen Cheng, Linkou (TW)

(73) Assignee: Hong-Wen Cheng, Taipei (TW)

( * ) Notice: Subject to any disclaimer, the term of this patent is extended or adjusted under 35 U.S.C. 154(b) by 15 days.

(21) Appl. No.: 13/015,584

(22) Filed: Jan. 28, 2011

(51) Int. Cl.
*G01C 17/34* (2006.01)

(52) U.S. Cl. ......................................................... 33/268

(58) Field of Classification Search .................. 33/1 SA, 33/1 SC, 268, 269, 270, 271
See application file for complete search history.

(56) References Cited

U.S. PATENT DOCUMENTS

| | | | | |
|---|---|---|---|---|
| 2,460,346 A | * | 2/1949 | Hagner | 33/269 |
| 3,066,415 A | * | 12/1962 | Jefferson | 33/1 SA |
| 3,486,234 A | * | 12/1969 | Waterman | 33/270 |
| 3,613,249 A | * | 10/1971 | Evenson | 33/268 |
| 4,970,793 A | * | 11/1990 | Atamian | 33/268 |
| 5,197,199 A | * | 3/1993 | Shrader | 33/270 |
| 5,459,931 A | * | 10/1995 | Waltho | 33/271 |
| 2007/0214665 A1 | * | 9/2007 | Courter | 33/270 |
| 2009/0044417 A1 | * | 2/2009 | Chen | 33/269 |

* cited by examiner

*Primary Examiner* — G. Bradley Bennett

(57) ABSTRACT

The present invention relates to a quasi-uniaxial solar trajectory tracking transit system including a canopy, a case, a first positioning ring, a second positioning ring and a pole. The canopy is a transparent hemisphere marked with a graduation line indicating elevation angles. The first positioning ring is a hollow body for receiving the second positioning ring. The two sides of the positioning ring have an axle respectively to connect with the case. The second positioning ring is a hollow fan-shape body for receiving the positioning pole. The second positioning ring has an axle perpendicular to the two sides of the axles of the first positioning ring for connecting to the first positioning ring thereby. The flange of the second positioning ring has a groove, and the central of the second positioning ring has an axle. A partial of positioning pole is hollow as a hollow pole and the other partial of the positioning pole is solid as a solid pole. A through hole is formed at the upper flange of the hollow pole and a sight is set at the lower flange thereof. The solid pole is axially connected to the axle of the second positioning ring.

11 Claims, 14 Drawing Sheets

QUASI-UNIAXIAL SOLAR TRAJECTORY TRACKING TRANSIT SYSTEM

BACKGROUND OF THE INVENTION

1. Field of the Invention

The present invention relates to a solar trajectory tracking system for the use of observing the position of sunshine and for documenting the trajectory thereof, thus to provide means to the researchers for comparison or for simulation in teaching.

2. Description of Related Art

At the present time, to learn the astronomic changes in a year is to devote a long period of time in observation and measurement to the status of the earth motion. Particularly, the earth is positioned inclined in a 23.5 degree angle with virtual central axle to conduct the revolution along the ecliptic plane around the sun. As the matter of fact, the position of sunshine is varying significantly every day according to the scientific data of the observation with the elevation and azimuth angle of the sun recorded at the appointed time and place. To learn the position differences of the sun in different latitudes only can depend on the observation results from a plurality of observation points.

According to the above need, there are scholars created the simulation model for observing the motion of the sun in order to help the students to understand more of the motion of the celestial body. As disclosed in Taiwan Patent No. 150675, referring to FIG. 1, the invention comprises a base 10, a canopy 20, a positioning ring 30 a pole 40 and a scale board 60; the scale board 60 is adjusted on the canopy 20 in order to gain a sunlight beam through the through hole to illuminate on the pole while facing the sun, thus a mark can be noted on the canopy to directly compare the positions of the latitude and the longitude to further learn the data of the azimuth and the elevation angle of the sun position at the present time.

The above prior art enables the user to learn the data of the azimuth and the elevation angle of the sun position at the present time. However, it requires a specific place and time of observation for a long period of time, and is only feasible for studying the related knowledge to the researchers, not for the educators to teach or to verify the trajectory of the motion of the celestial body. Besides, to operate the device of the prior art can only depend on the human eye to verify whether the sunlight beam is aligned to reach to the required position, thus it's not an ideal device for the first-time operator to successfully operate.

Furthermore, the means that educators nowadays use in observing the solar motion and the simulation are only to input the longitude and the latitude of the observed location or to setup the longitude and the latitude and the observation time to learn the data of the azimuth and the elevation angle of the position of the sun; nevertheless, the inaccurate data can be of help to retrieve the right position of the sun corresponding to the observation location.

In view of the above defect, the present invention is based on the research of various latitudes, seasons and daily time on the earth, which resulted to a discovery that a certain regular alternation existing in the solar trajectory, and this theory has been applied in the quasi-uniaxial solar trajectory transit of the present invention. By adjusting the first positioning ring to program the local latitude and the second positioning ring to program the time and the pole to set the date (season), thus accurately track the orientation of the direct sunlight, remark on the canopy to directly compare the location of the latitude and the longitude in order to learn the precise azimuth and the elevation angle of the sun; the above first ring, the second ring and the pole are the means to apply for the fine adjustment of daily and the yearly periodic alternation, which conduct the experiment of the solar trajectory simulation. The present invention is designed to provide the transit, which is applied for the observation and for the solar trajectory simulation, and to enable the user to observe or to simulate the solar trajectory any location, time and season.

SUMMARY OF THE INVENTION

According to an aspect of the present invention, the location, the time and the season are set to precisely track the orientation of the direct sunlight in order to observe the azimuth, elevation angle and the motion track of the sun.

According to another aspect of the present invention, the quasi-uniaxial solar trajectory tracking transit system simulates the position of the sun and the motion track thereof.

According to another aspect of the present invention, the simple structural quasi-uniaxial is provided as a dual functional quasi-uniaxial solar trajectory tracking transit system for the observation and the simulation in the solar position.

For achieving the above objectives, the quasi-uniaxial solar trajectory tracking transit system of the present invention comprises a case, a canopy, a first positioning ring, a second positioning ring and a pole. The case has an opening at the upper flange for receiving the first positioning ring, the second positioning ring and the pole. The canopy is a transparent hemisphere with a graduation line of the elevation angle. The first positioning is a hollow body for receiving the second positioning ring and has axles on the two respective sides to assemble with the case. The second positioning ring is a hollow fan-shape body for receiving the pole, and has axle positioned perpendicular to the two sides of the first positioning ring for connecting to the first positioning ring thereby. The flange of the second positioning ring has a groove, and the central of the second positioning ring has an axle. A part of the pole is hollow as a hollow pole and the other part of the pole is solid as a solid hole. A through hole is formed at the upper flange of the hollow pole and a sight is set at the lower flange thereof. The solid pole is axially connecting to the axle of the second positioning ring. The first positioning ring can be rotated to the required angle according to the local latitude and the second positioning ring can be turned to set the time for conducting the observation, at the end, the pole can be adjusted to set the date (season) for conducting the observation. Thus, the orientation of the direct sunlight can be automatically and precisely tracked by setting the position, time and the date (season), in order to learn the azimuth and the elevation angle.

The above quasi-uniaxial solar trajectory tracking transit system has the case with a circular groove to hold the canopy, and the graduation for indication of the azimuth is marked around the canopy.

The above quasi-uniaxial solar trajectory tracking transit system has the graduation marked on the outer side of the case and the two sides of the case connecting with the axle of the first positioning ring for indicating the latitude.

The above quasi-uniaxial solar trajectory tracking transit system has the graduation marked on the canopy indicating the elevation angle, which can be marked in the fashion of whole coverage, semi coverage or partial coverage.

The above quasi-uniaxial solar trajectory tracking transit system has the first positioning ring with the axle of which comprise a regulator hand for adjusting the angle according to the local latitude, and is applicable in both northern hemisphere and the southern hemisphere for observing or simulating the solar track.

The above quasi-uniaxial solar trajectory tracking transit system has the first positioning ring with a positioning portion for securing the first positioning ring after setting the angle.

The above quasi-uniaxial solar trajectory tracking transit system has the first positioning ring with the graduation marked at the two outer portions where having connects with the axle of the second positioning ring for indicating the time.

The above quasi-uniaxial solar trajectory tracking transit system has the second positioning ring with a regulator hand on the axle for setting the time.

The above quasi-uniaxial solar trajectory tracking transit system has the second positioning ring with a positioning portion for securing the second positioning ring after setting the time.

The above quasi-uniaxial solar trajectory tracking transit system has the second positioning ring with a gradation around the groove provided to the pole for setting the date (season).

The above quasi-uniaxial solar trajectory tracking transit system has the pole with a positioning portion for securing the pole after setting the date (season).

The above quasi-uniaxial solar trajectory tracking transit system has the pole than can receive a laser indicator pen in the through hole or above the sight thereof.

The above quasi-uniaxial solar trajectory tracking transit system has the laser indicator pen that can be inlayed or threaded in the through hole or above the sight.

The above quasi-uniaxial solar trajectory tracking transit system has the case, the first positioning ring and the second positioning ring and the pole of which can be made of the material selected from the light weighed metal, for example, iron plate, aluminum alloy or titanium alloy, or hard reinforced plastic.

The above quasi-uniaxial solar trajectory tracking transit system has the canopy made of hard reinforced plastic or glass.

The above quasi-uniaxial solar trajectory tracking transit system has a positioning portion in a first positioning ring, a second positioning and a pole respectively, which can be designed as a screw, a hook or a stopper.

The detailed description for other features and the embodiments is as follows.

BRIEF DESCRIPTION OF THE DRAWING

For more complete understanding of the present invention, reference will now be made to the following detailed description of preferred embodiments taken in conjunction with the following accompanying drawings.

DETAIL DESCRIPTION OF THE INVENTION

Figure 1:
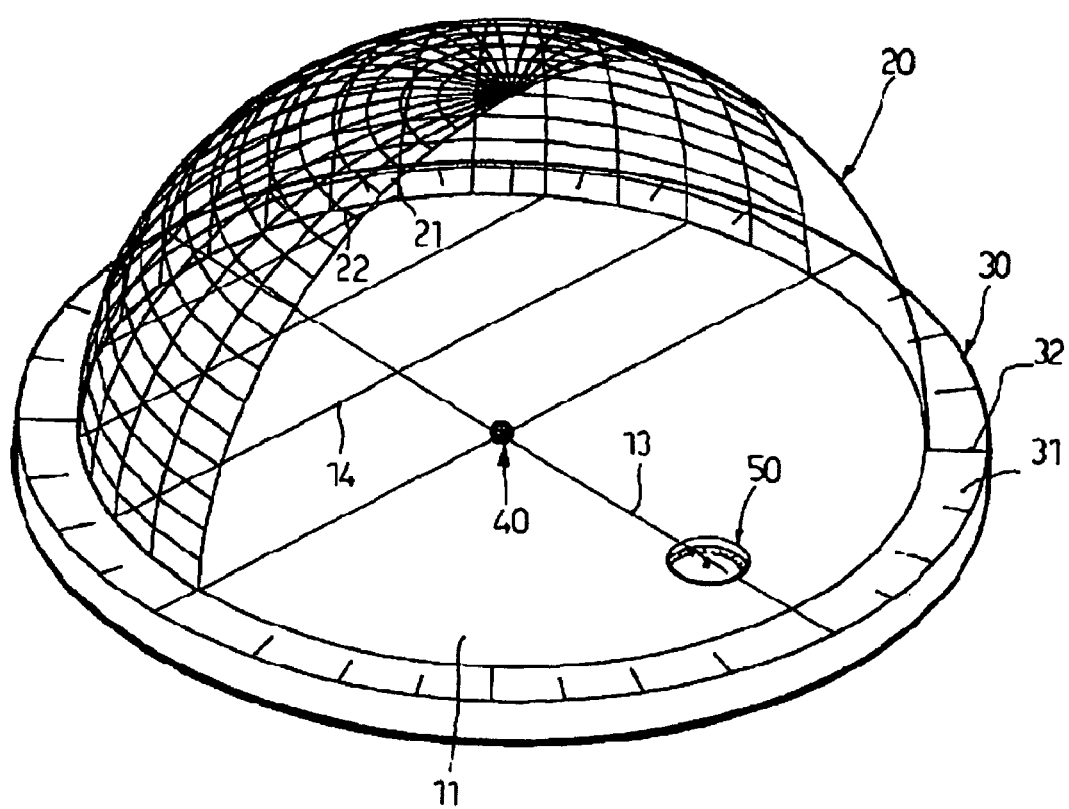
FIG. 1 is an aspect of a conventional art, Taiwan Patent No. 150675.
Figure 2:
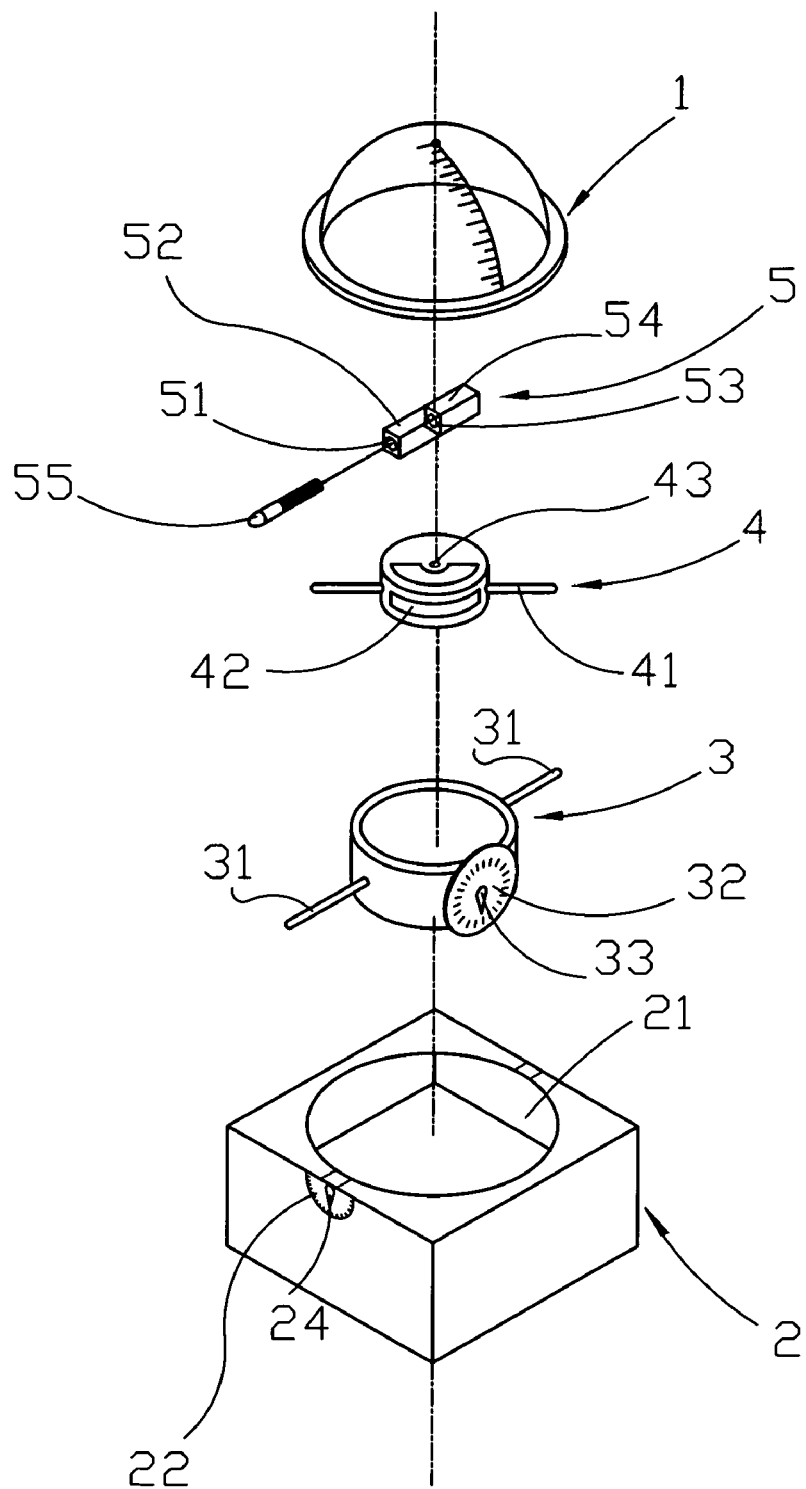
FIG. 2 is an exploded view according to a preferred embodiment of the present invention.
Figure 3:
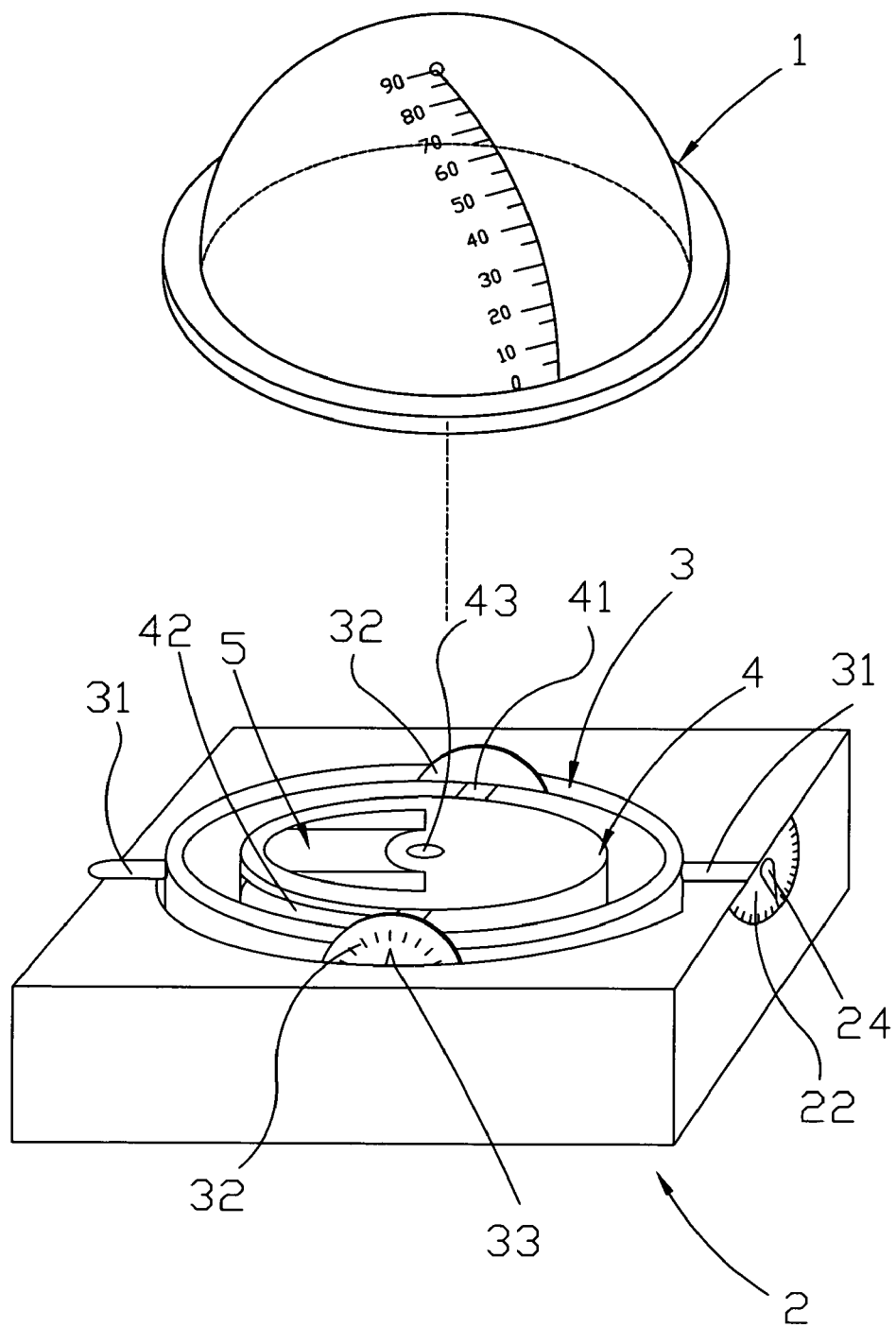
FIG. 3 is an elevational view according to a preferred embodiment of a present invention.

Referring to FIGS. 2 and 3, the quasi-uniaxial solar trajectory tracking transit system comprises a canopy 1, a case 2, a first positioning ring 3, a second positioning ring 4 and a pole 5. The canopy 1 is a transparent hemisphere marked with a graduation line indicating the elevation angles. The case 2 has an opening 21 at an upper flange for receiving the first positioning ring 3, the second positioning ring 4 and the pole 5. The first positioning ring 3 is a hollow body for receiving the second positioning ring 4. The dimension of the first positioning ring 3 is slightly smaller than the opening 21 of the case 2. The two sides of the first positioning ring 3 have an axle 31 respectively to connect with the case 2.

The second positioning ring 4 is a hollow fan-shape body for receiving the pole 5, the dimension of the second positioning ring 4 is slightly smaller than the first positioning ring 3. The second positioning ring 4 has an axle 41 positioned perpendicular to the two sides of the axles 31 of the first positioning ring 3 for connecting to the first positioning ring 3 thereby. The flange of the second positioning ring 4 has a groove 42, and the central of the second positioning ring 4 has an axle 43. A part of pole 5 is hollow as a hollow pole 52 and the other part of the pole 5 is solid as a solid pole 54. A through hole 51 is formed at an upper flange of the hollow pole 52 and a sight 53 is set at a lower flange thereof. The solid pole 54 is axially connected to the axle 43 of the second positioning ring 4.

Figure 8:
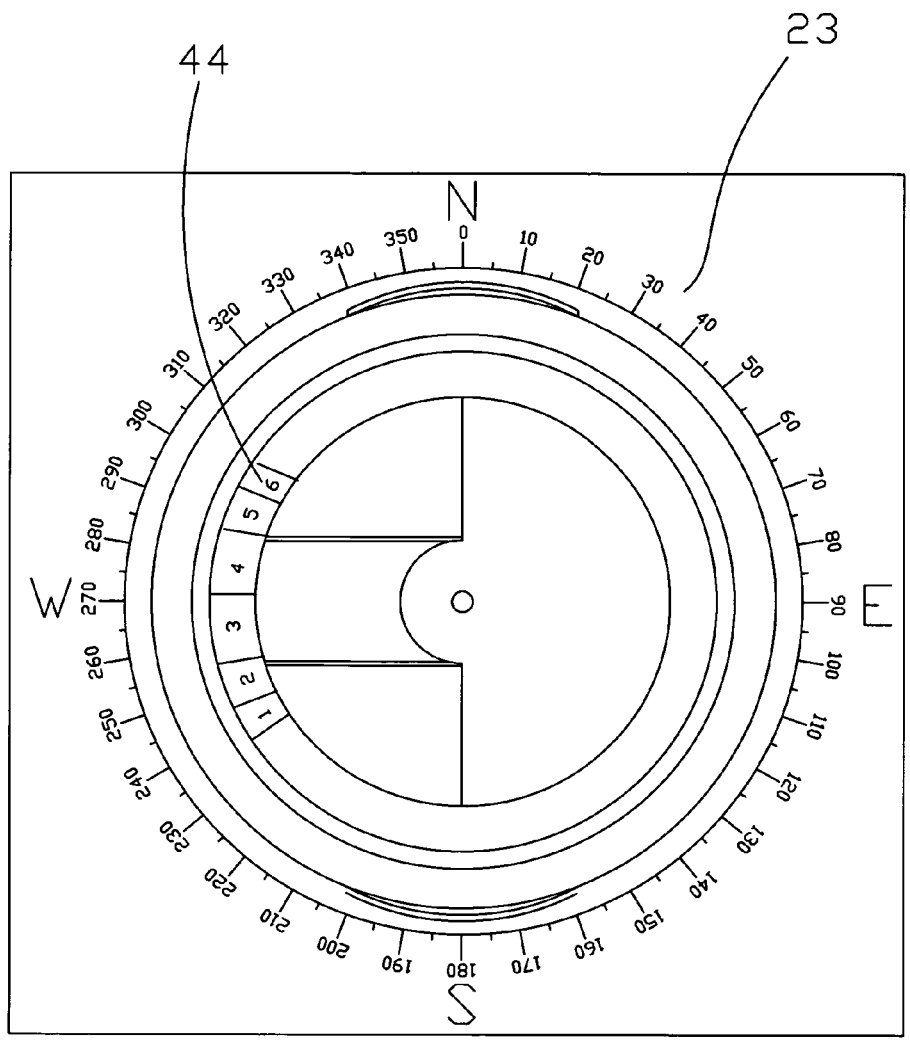
FIG. 8 is a top view according to a preferred embodiment of the present invention.

The graduation line marked on the canopy 1 of the present invention indicating the elevation angle can be marked in the fashion of whole coverage, semi coverage or partial coverage. The flange of the opening 21 of the case 2 can be a circular groove to receive the canopy 1. The outer flange of the case 2 within the canopy 1 has the graduation 23 indicating the azimuth angle (referring to FIG. 8). The axle 31 of the first positioning ring 3 and the axle 41 of the second positioning ring 4 respectively have regulator hands 24, 33 for adjusting the angle according to the local latitude and to set the local solar time. The second positioning ring 4 with a date scale 44 around the groove 42 provided to the pole 5 for setting the date (season). The canopy 1 is made of material selected from a hard reinforced plastic or glass. The case 2, the first positioning ring 3, the second positioning ring 4 and the pole 5 may be made of material selected from the light-weighted metal, such as the iron plate, the aluminum alloy, the titanium alloy, or the hard reinforced plastic.

Referring to FIGS. 3 to 7, the operation procedure of the embodiment is described as follows.

Before operation, referring to FIG. 3, the first positioning ring 3, the second positioning ring 4 and the pole 5 are all parallel to the case 2 without any angle alteration.

Figure 4:
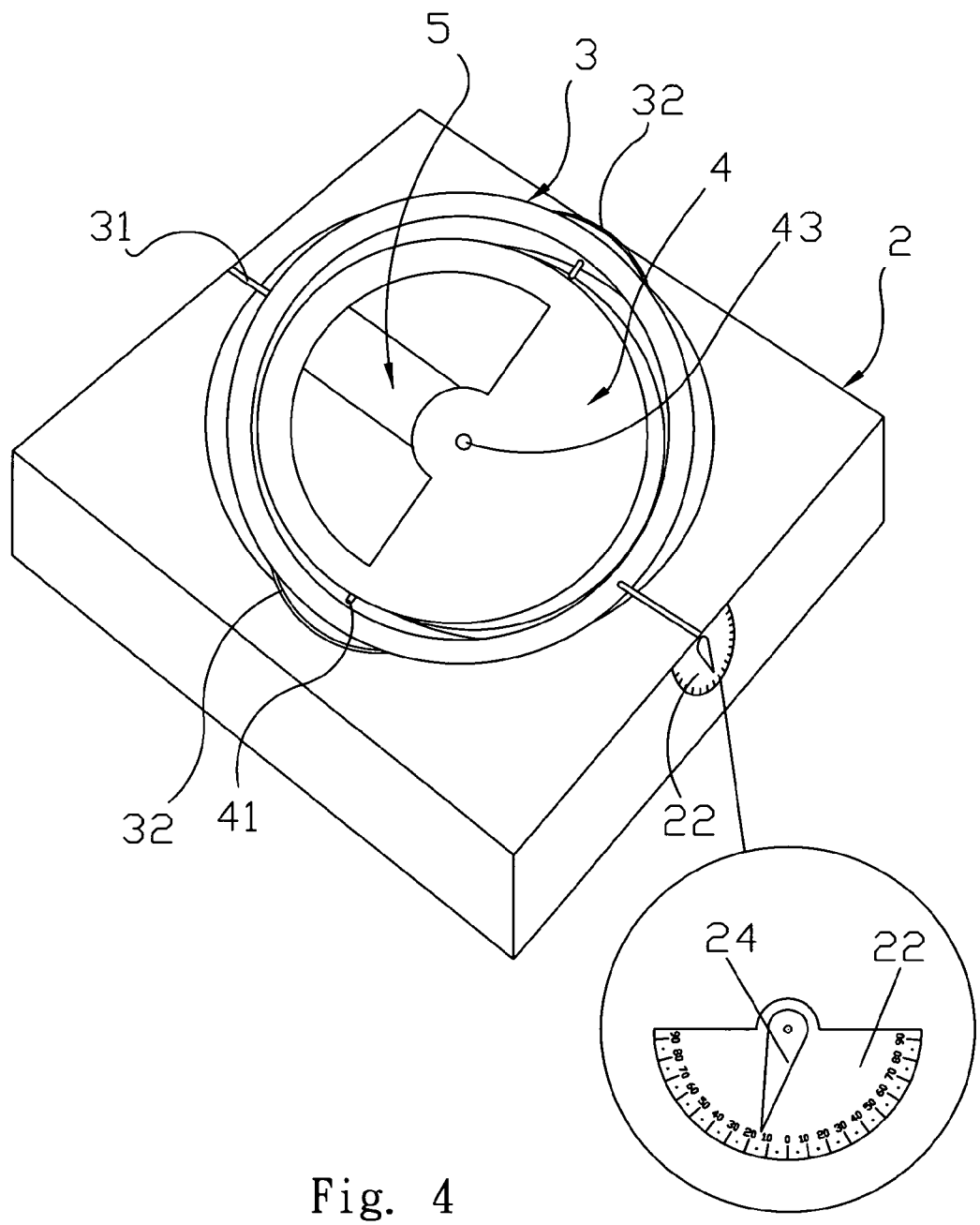
FIG. 4 is a view illustrating motion of rotation of a first positioning ring according to a preferred embodiment of the present invention.
Figure 5:
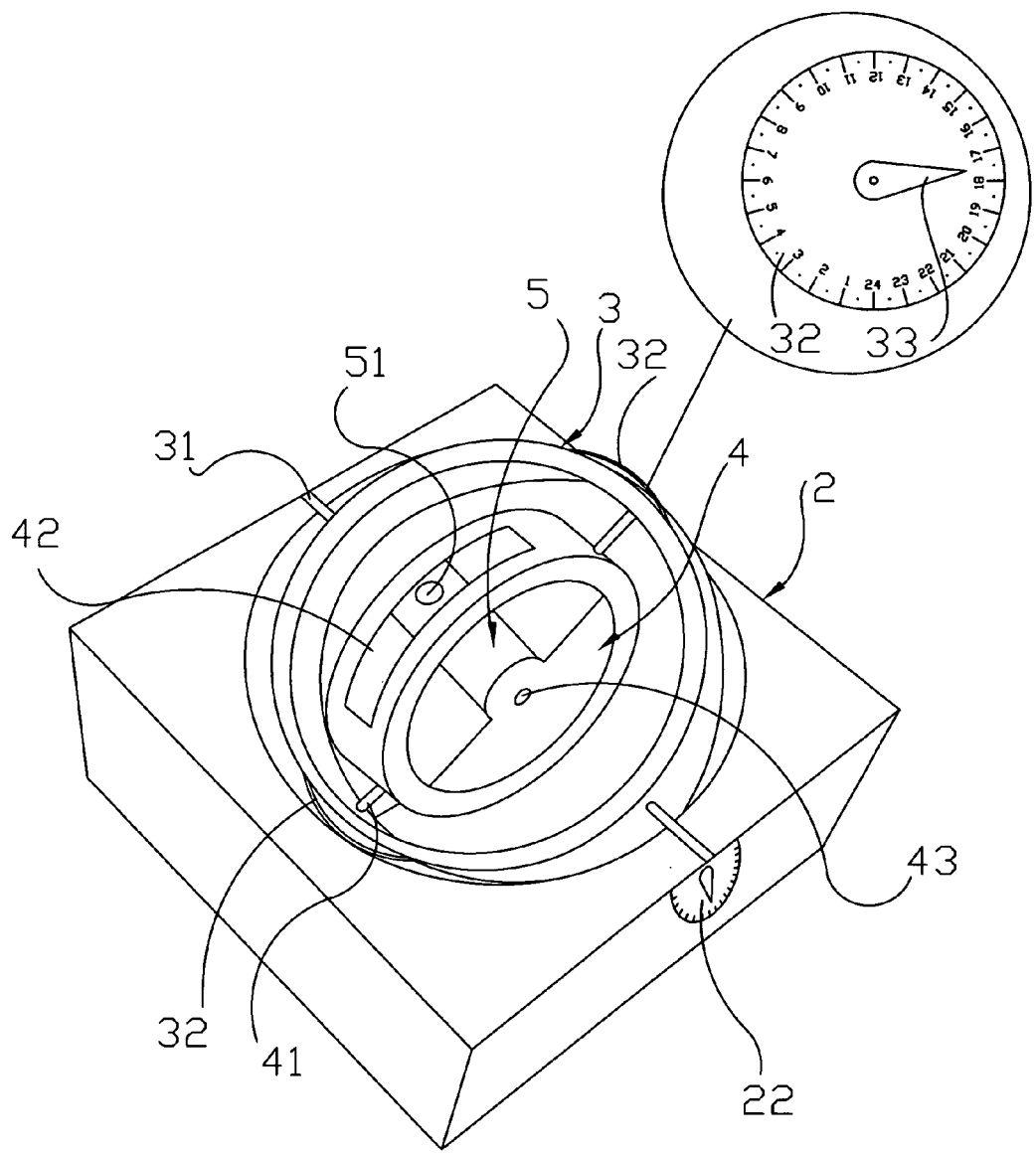
FIG. 5 is a view illustrating the motion of rotation of a second positioning ring according to a second embodiment of the present invention.
Figure 6:
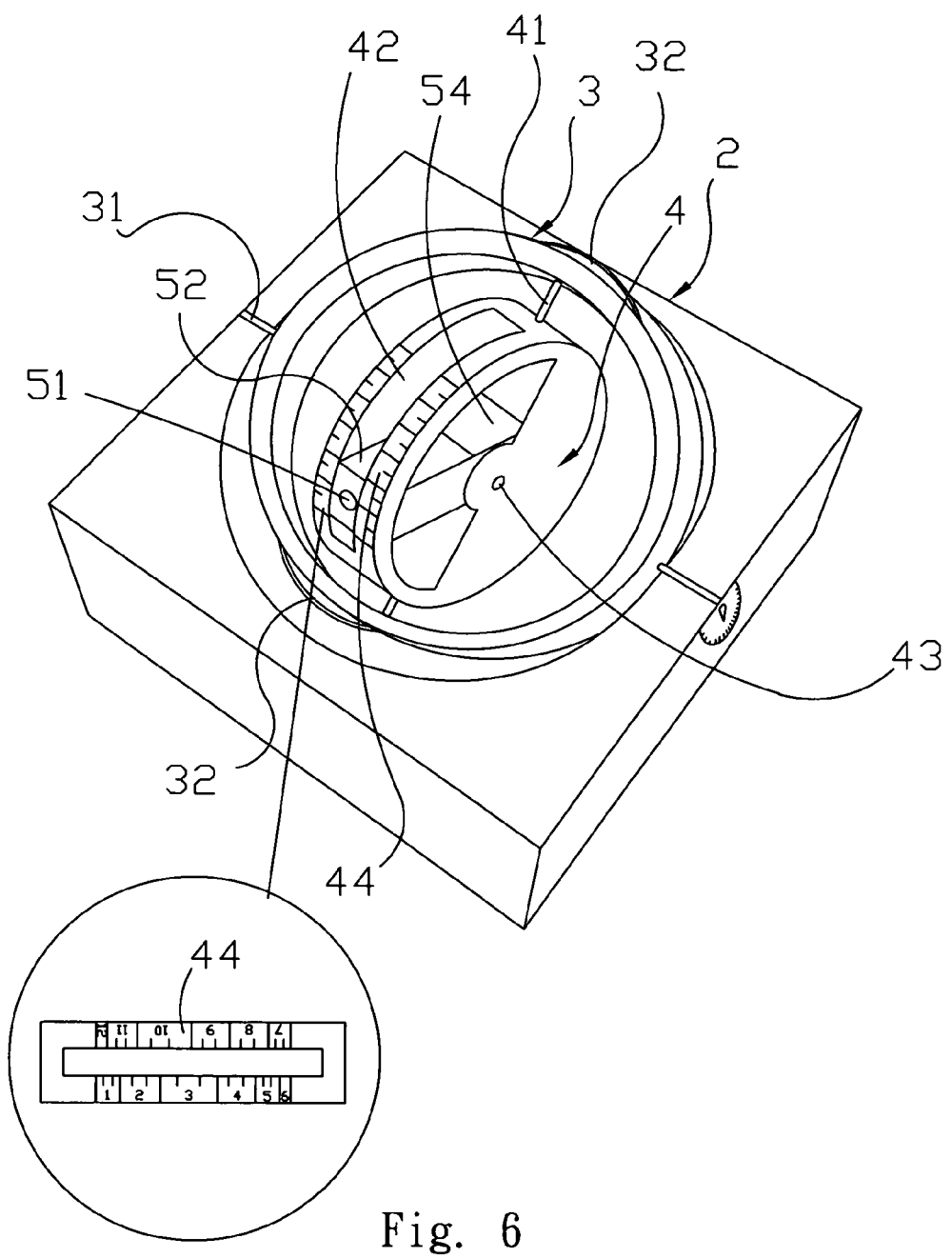
FIG. 6 is a view illustrating the movement the pole according to a second embodiment of the present invention.

In the operation, the procedure for setting is described as follows. Referring to FIGS. 4 to 6, first of all, the first positioning ring 3 is set according to the location (latitude) of the observation station (FIG. 4). The rotation of the first positioning ring 3 corresponds to the latitude graduation 22 marked on the outer side of the case connected to the two distal end of the axle 31 of the first positioning ring 3. The hand 24 is adjusted to align with the scale of the local latitude 22, then the first positioning ring 3 is secured by the positioning portion (not shown) to stop the rotation of the first positioning ring 3. Furthermore, the second positioning ring 4 is rotated according to the observation time (hour). Referring to FIG. 5, the rotation of the second positioning ring 4 corresponds to the time graduation 32 (24 hours) marked on the outer surface of the first positioning ring 3 connected to the two distal ends of the axle 41 of the second positioning ring 4. The regulator hand 33 is adjusted to align with the scale of the local observation time (24 hours), then the second positioning ring 4 is adjusted by the positioning portion (not shown) to stop the rotation of the second positioning ring 4. Finally, the pole 5 is moved according to the date (season) of the observation as illustrated in FIG. 6. The pole 5 is moved according to the date (season) scale 44 marked around the groove 42 of the second positioning ring 4 and securing the pole 5 by the positioning portion (not shown) to stop the motion of the pole 5 when the pole 5 moves to align with the observation date (season) scale. In the embodiment of the present invention, the positioning portion may be comprised of a screw, a hook or a stopper.

The above setting steps are based on the earth revolution track and the earth rotation order. As the sunlight illuminates on various parts of the earth surface with various latitudes, the motion track can be categorized into three types, the 24-hour daily alternation concerning sunrise and sunset, 365-day yearly alternation of which concerning the change of seasons, and the less significant and ignorable precession and nutation of the earth rotation. The time setting step is based on the daily alternation; the earth rotation generally causes the sunrises and the sunsets, the time to be concluded as a day is when the sun passes the meridian twice continuously, and it's called the solar day. The solar day may be further divided into 24 hours, therefore the embodiment of the present invention needs to set the time. Furthermore, the step for setting the date (season) is based on the yearly alternation. The sun not only proceeds self rotations but also solar revolutions. A cycle of the revolution is called a year, and the motion of the earth goes along the track plane of the solar revolution is called the ecliptic plane. The direction of the plane normal of the ecliptic plane is positioned at an angle (about 23.5 degree) to the earth self-rotation axle, and the angle is called inclined angle of the earth rotation axle. The inclined angle enables the sun directly illuminate on the northern hemisphere in the summer and oblique illumination on the earth surface in the winter to create the seasonal alternation, the hot summer and the cold winter. The embodiment of the present invention thus requires for setting the date (season).

Figure 7:
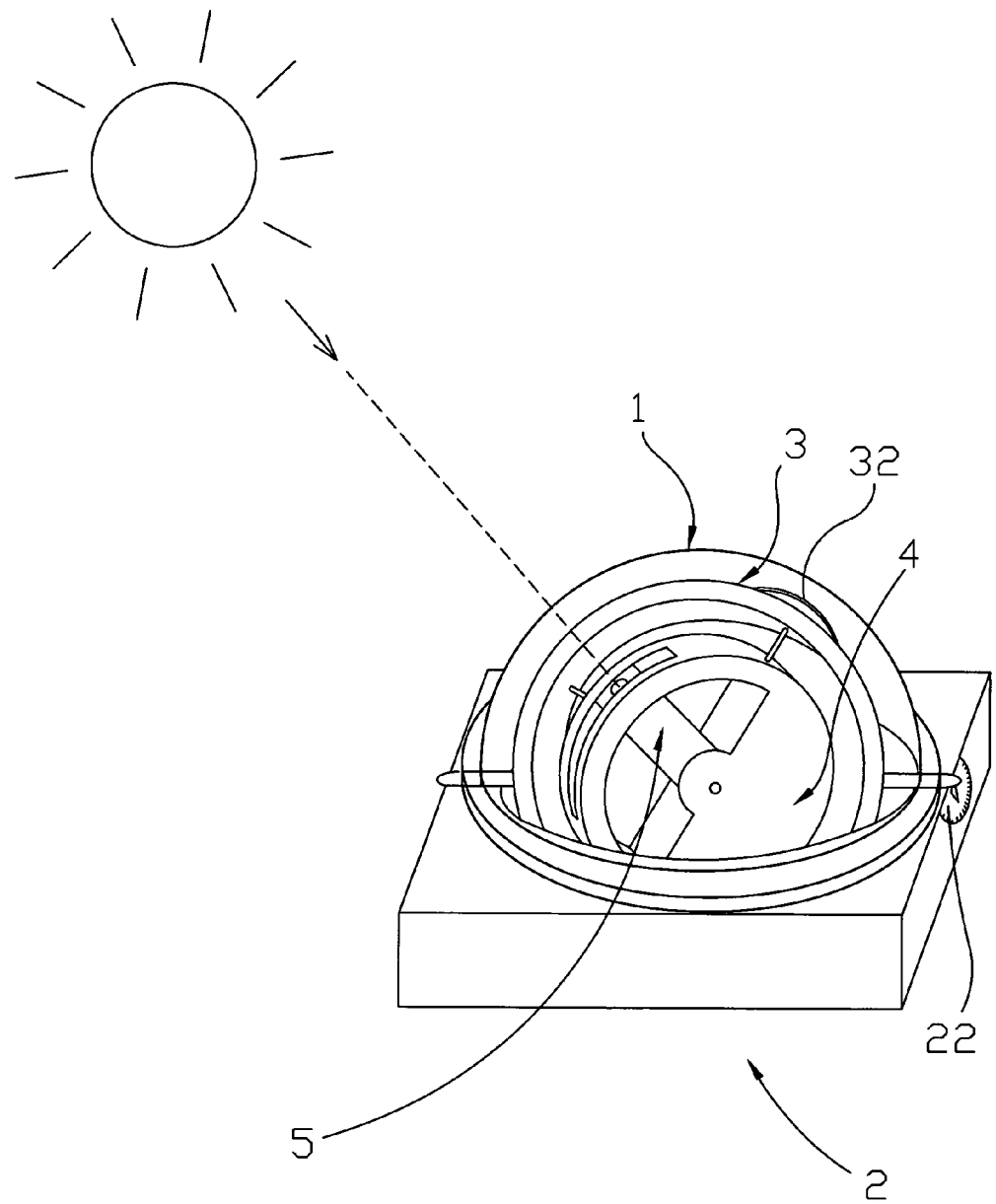
FIG. 7 is an aspect illustrating the operation according to a preferred embodiment of the present invention.

Referring to FIG. 7, the above steps for setting latitude, time and date (season), the azimuth graduation 23 of the case 2 is arranged according to the local orientation in operation, and the direction thereof can refer to the compass. The canopy 1 is placed and data as well as documentation are read for the solar azimuth and the elevation angle according to the azimuth graduation 23 of the case 2. Meanwhile, the sunlight directly enter through the through hole 51 of the pole 5 and further penetrates through the hollow pole 52 to directly illuminate on the sight 53. The user can set a laser indicator pen 55 (FIG. 2) in the through hole 51 or the sight 53 of the pole 5, and thereby learn the azimuth and the elevation angle of the sun corresponding to the canopy 1. The laser indicator pen 55 can be inlayed or screwed to an inner side of the through hole 51 or on the sight 53. By repeating the above steps for recording each orientation of the sun in orderly manner on the canopy 1 can substantially conclude the data of the solar trajectory.

Furthermore, the present invention can be applied for simulating the solar trajectory track, and the steps of the procedure are the same as the above embodiment except for the setting of the solar orientation of the location, time and season can be random without referring to the local latitude and longitude, time and season. After completing the setting, a laser indicator pen 55 is installed in the through hole 51 or on the sight 53 of the pole 5 to learn the azimuth and the elevation angle of the sun corresponding to the canopy 1. The laser indicator pen 55 can be inlayed or screwed to an inner side of the through hole 51 or on the sight 53. By repeating the above steps of recording each orientation of the sun in orderly manner on the canopy 1 can substantially conclude the data of the solar trajectory.

Figure 9:
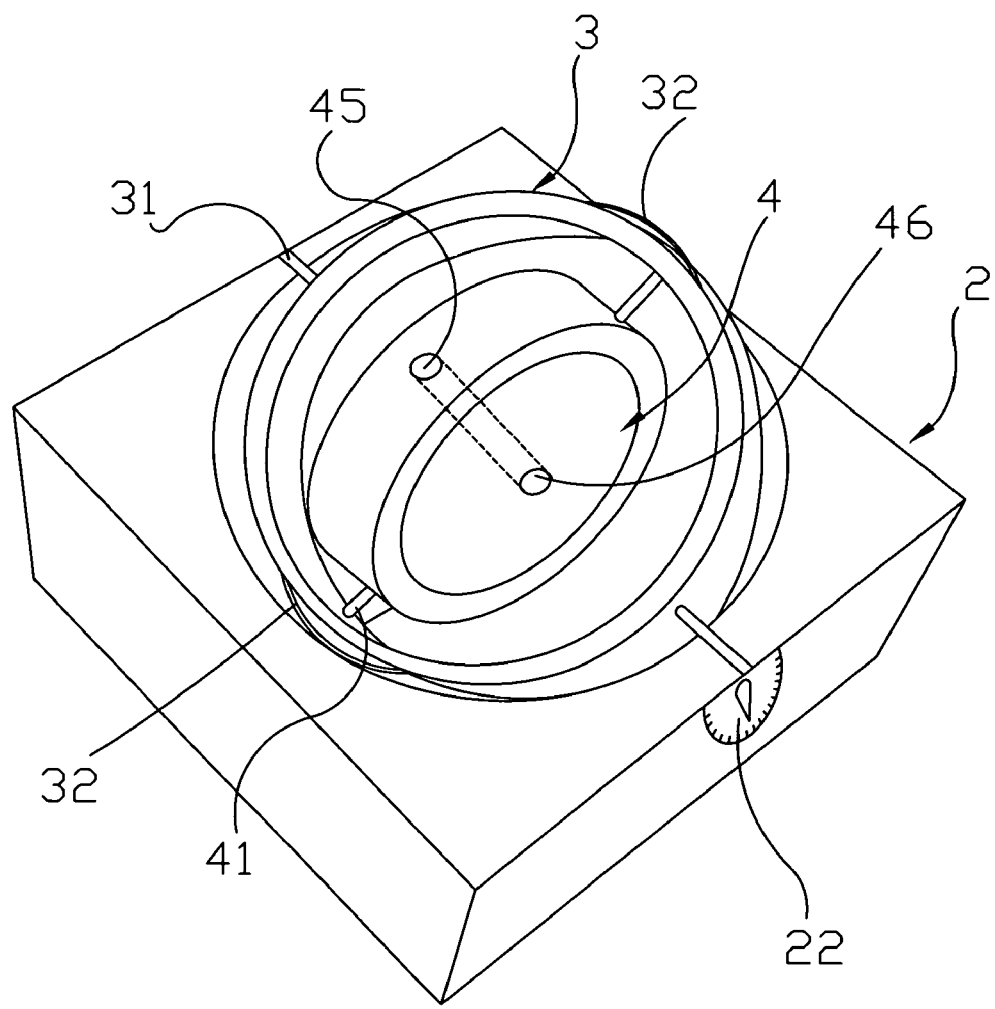
FIG. 9 is an elevational view according to a preferred embodiment of the present invention.

Referring to FIG. 9, another embodiment of the present invention comprises a canopy 1, a case 2, a first positioning ring 3 and a second positioning ring 4. The canopy 1 is a transparent hemisphere marked with a graduation line indicating the elevation angles. The case 2 has an opening 21 at the upper flange for receiving the first positioning ring 3, and the second positioning ring 4. The first positioning ring 3 is a hollow body for receiving the second positioning ring 4. The dimension of the first positioning ring 3 is slightly smaller than the opening 21 of the case 2. The two sides of the first positioning ring 3 comprise an axle 31 respectively to connect with the case 2.

The second positioning ring 4 is a solid body, and the dimension of the second positioning ring 4 is slightly smaller than the first positioning ring 3. The second positioning ring 4 has an axle 41 positioned perpendicular to the two sides of the axles 31 of the first positioning ring 3 for connecting to the first positioning ring 3 thereby. The flange of the second positioning ring 4 has a through hole 45 extending to the central of the second positioning ring 4 and has a sight 46 therein. The operation procedure of this embodiment is described as follows. The first positioning ring 3 is rotated to a required angle according to the local latitude, the second positioning ring 4 is rotated for further setting the observation time. Thus, by setting the location and time, the sunlight directly illuminates onto the sight 46 after penetrating through the through hole 45 of the second positioning ring 4, the azimuth and the elevation angle of the sun can be observed.

Figure 10:
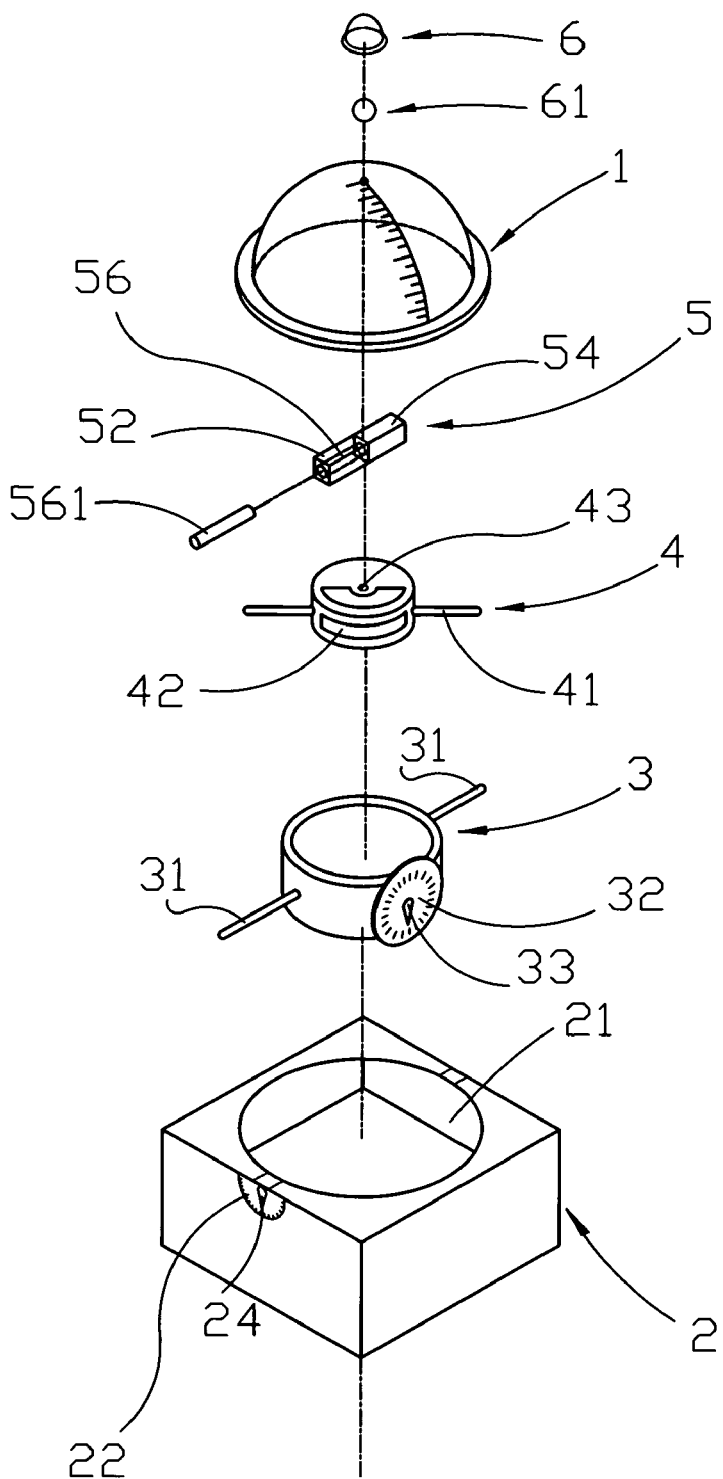
FIG. 10 is an exploded view according to another preferred embodiment of the present invention.
Figure 11:
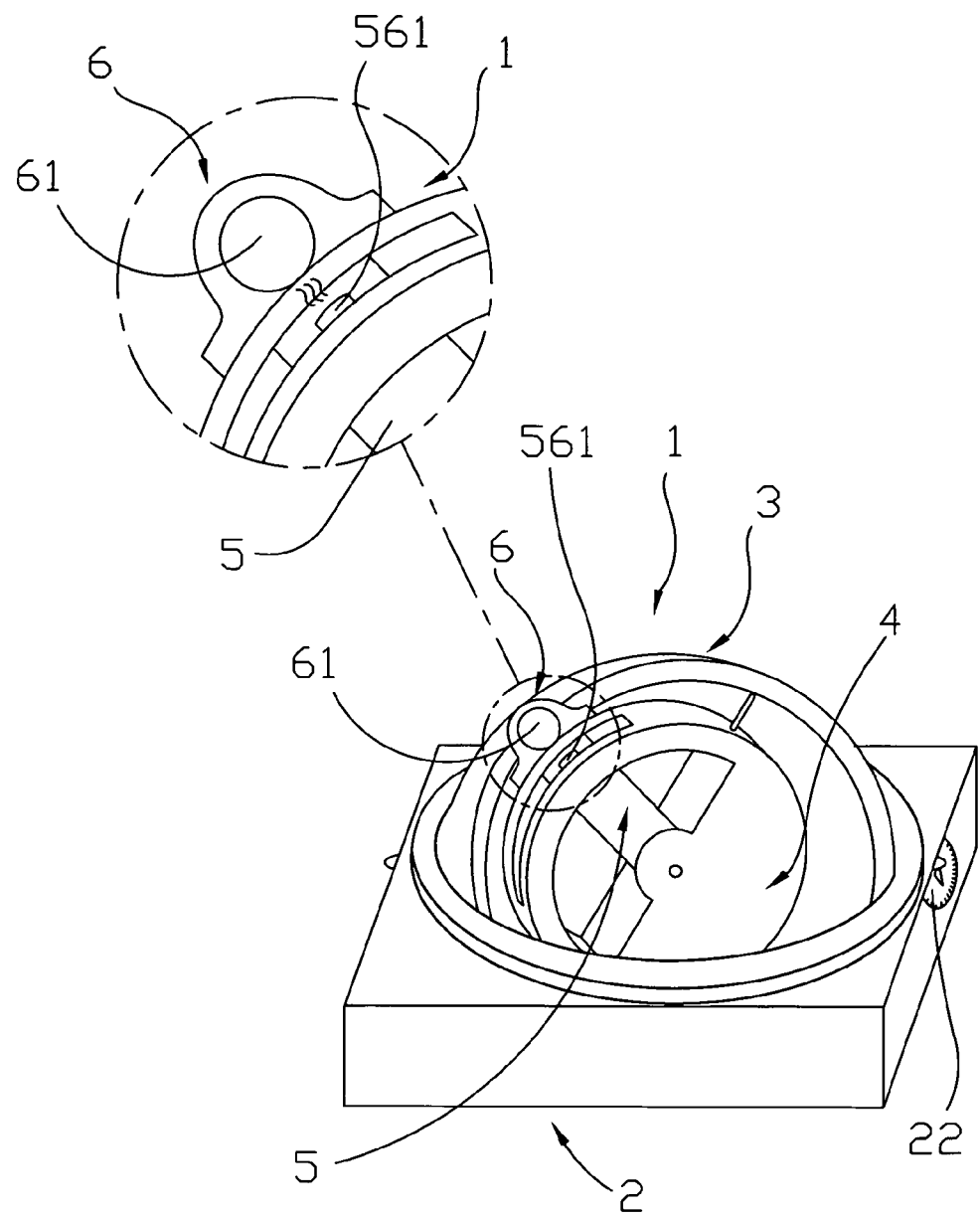
FIG. 11 is an elevational view according to another preferred embodiment of a present invention.

Another embodiment of the present invention, as shown in FIGS. 10 and 11, comprises a canopy 1, a case 2, a first positioning ring 3, a second positioning ring 4, a positioning pole 5 and a positioning button 6. The canopy 1 is a transparent hemisphere marked with a graduation line indicating the elevation angles. The case 2 has an opening 21 at the upper flange for receiving the first positioning ring 3, the second positioning ring 4 and the positioning pole 5. The first positioning ring 3 is a hollow body for receiving the second positioning ring 4. The dimension of the first positioning ring 3 is slightly smaller than the opening 21 of the case 2. The two sides of the first positioning ring 3 comprise an axle 31 respectively to connect with the case 2. The positioning button 6 has a magnet 61. The positioning button 6 is a separate piece that can be separated from the solar trajectory tracking system of the present invention.

The second positioning ring 4 is formed in a fan shape with a hollow space for receiving the positioning pole 5, and the dimension of the second positioning ring 4 is slightly smaller than the first positioning ring 3. The second positioning ring 4 has an axle 41 positioned perpendicular to the two sides of the axles 31 of the first positioning ring 3 for connecting to the first positioning ring 3 thereby. The flange of the second positioning ring 4 has a groove 42 and a center of the second positioning ring 4 has an axle 43. The positioning pole 5 has a hollow pole 52 and a solid pole 54, and an inlaying tube 56 is positioning within the hollow pole 52. A magnet 561 is positioned at the frontal end of the inlaying tube 56, or directly in the hollow pole 52. The solid pole 54 and the axle 43 of the second positioning ring 4 are connected axially.

The material of forming the canopy 1 and the positioning button 6 can be selected from a high hardness reinforced plastic or glass, the positioning button 6 has a radius smaller than a radius of the canopy 1, and the length of the positioning pole 5 is slightly smaller than the radius of the canopy 1, thus the top of the positioning pole 5 can closely attach to the inner surface of the canopy 1. The magnet 61 can be formed in a shape of a sphere, a hemisphere, a tube, a rectangle or other geometrical shapes. The magnet 561 can be formed in a shape of a cylinder, a cuboid or other geometrical shapes.

Figure 12:
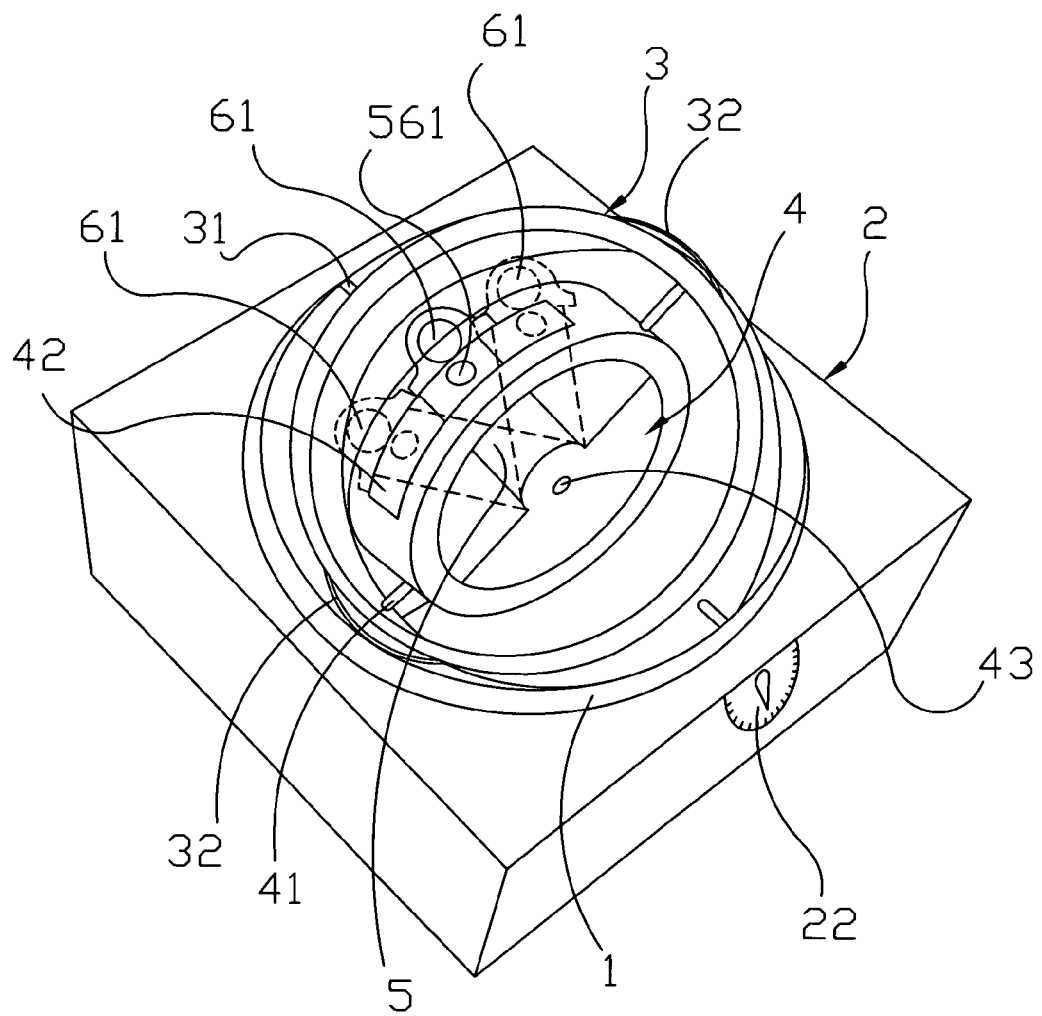
FIG. 12 is an aspect illustrating the operation according to another preferred embodiment of the present invention.

To operate the embodiment of the present invention, first of all, assemble the first positioning ring 3, the second positioning ring 4 and the positioning pole 5 and place into the case 2. Thereafter, place the canopy 1 to position the positioning button 6 corresponding to the top of the positioning pole 5 having the magnet 561, then place the positioning button 6 atop of the surface of the canopy 1. The magnetic attraction between the magnet 61 of the positioning button 6 and the magnet 561 of the hollow pole 52 enables the positioning button 6 to steadily stay on the canopy 1. Furthermore, the magnetic attraction as well by drawing the positioning pole 5 together, the positioning pole 5 is movable along with the positioning button 6 with the magnetic attraction between the magnets 561 and 61. By moving the positioning button 6 positioning atop of the canopy 1, the positioning pole 5 can be moved and further can motivate the first positioning ring 3 and the second positioning ring 4 to rotate. To move the positioning button 6 to the accurate position by referring to the simulation of latitude, longitude and time. The latitude graduation 22, the azimuth graduation 23, the time graduation 32 and the date scale 44 can be used to help if the user needs to learn whether moving to the accurate position. Accordingly, to move the positioning button 6 (as shown in FIG. 12) can simulate the azimuth and the altitude of the sun position, and to repeat the above operation can mark the solar positions on the surface of the canopy 1 to simulate the solar track in other timing. The track can be outlined by using a marker.

Figure 13:
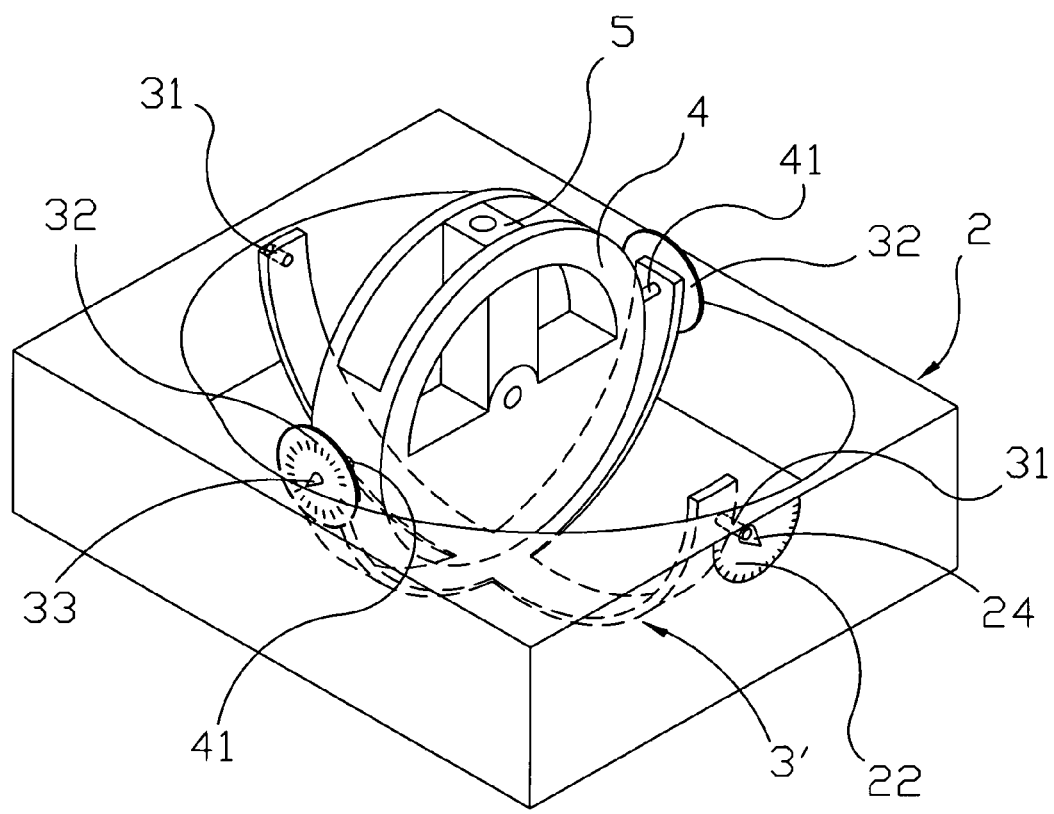
FIG. 13 is an elevational view according to another preferred embodiment of a present invention.
Figure 14:
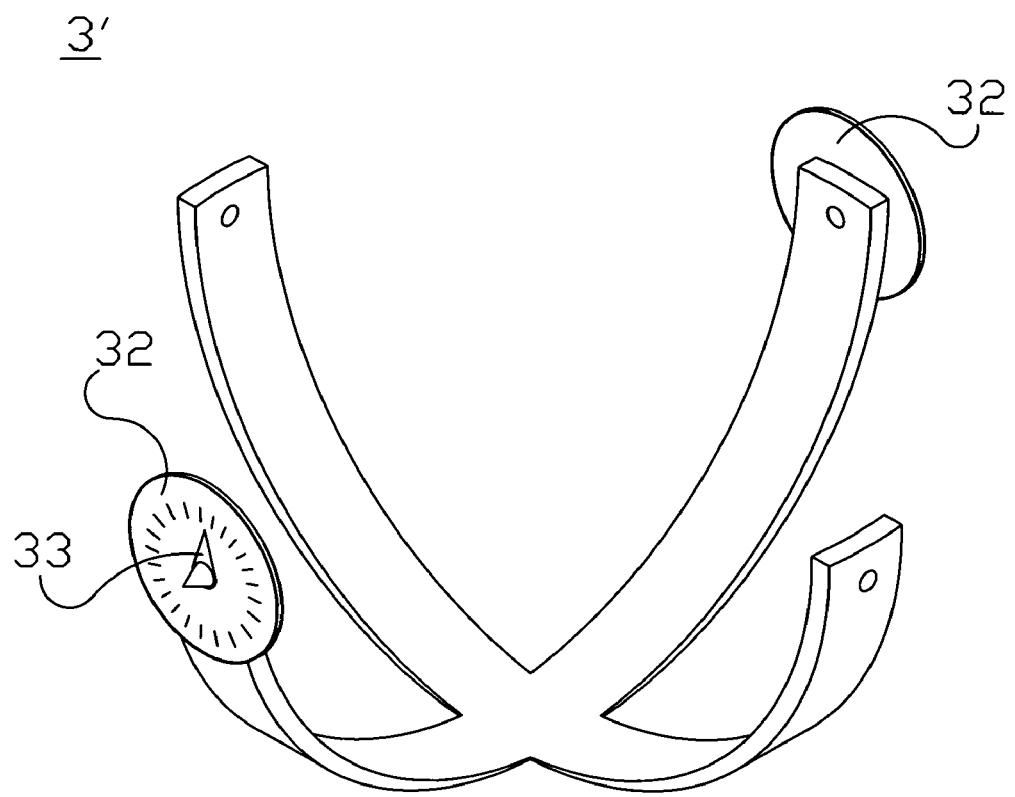
FIG. 14 is an elevational view of a first positioning ring according to another preferred embodiment of a present invention.

FIG. 13 is an elevational view of another embodiment of the present invention, the first positioning ring 3' is crossed semicircular (referring to FIG. 14 as well). The crossed semicircular frame of the first positioning ring 3' forms a space to receive the second positioning ring 4. The dimension of the first positioning ring 3' is slightly smaller than that of the opening 21 of the case 2. The two sides of the first positioning ring 3' respectively have an axle 31 to connect to the case 2. The other two sides of the first positioning ring 3' without the axles 31 are axially connecting to the axles 41 on the two sides of the second positioning ring 4. The axles 41 are connected to a regulator hand 33. The first positioning ring 3' can be turned according to the latitude graduation 22 marked on the outer side of the case 2 corresponding to the first positioning ring 3' and the two conjoined sides of the axles 31 of the first positioning ring 3', until the regulator hand 24 is aligned with the latitude graduation 22 of the location to complete the setting of the latitude. Then the second positioning ring 4 can be turned according to the observation time. The rotation of the second positioning ring 4 corresponds to the time graduation 32 marked on the two sides of the conjunction of the axles 41 of the second positioning ring 4 and the first positioning ring 3'. The second positioning ring 4 can be turned until the regulator hand 33 align to the time graduation of the observation time to complete the setting of the time.

According to the above depiction, the present invention can substantially achieve the goal thereof; by adjusting the first positioning ring to set the local latitude and to second positioning ring for the time, as well use of the pole to set the local date (season) can substantially trace the solar orientation. Marking on the canopy can directly compare the longitude and the latitude to learn the data of the azimuth and the elevation angle of the sun. The above first and second positioning rings and the pole can also perform the solar trajectory tracking during the sunless time. Therefore, the present invention can perform to observe and to simulate the solar trajectory tracking at any place, any time and any season. The quasi-uniaxial design not only enables the user to learn the precise solar trajectory, and also the simple structure can be used as the school education instrument.

While the invention has been described in conjunction with a specific best or preferred mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. An improved quasi-uniaxial solar trajectory tracking transit system comprising:
    a case, having an opening at an upper flange thereof;
    a canopy, having a transparent hemisphere marked with a graduation line indicating elevation angles, and a bottom flange covering said upper flange of said case;
    a first positioning ring, including a hollow body having a smaller dimension than said opening of said case, having axles respectively on two sides to join to said case;
    a second positioning ring, comprising a hollow fan-shape body having a smaller dimension than said first positioning ring, and an axle positioning perpendicular to two sides of said axles of said first positioning ring for connecting to said first positioning ring; wherein a flange of said second positioning ring comprises a groove, and a central of said second positioning ring comprises an axle;
    a positioning pole, having a part thereof being a hollow pole and another part thereof being a solid pole connected by said axle of said second positioning ring, and a hollow pole has a magnet received within; and
    a positioning button, having a magnet within, formed as a single piece and positioning detached to the outer surface of said canopy, wherein said first positioning ring is inserted into said opening of said case, to place said second positioning ring into said hollow portion of said first positioning ring, and further to place said positioning pole into said fan-shape hollow part of said second positioning ring; said bottom portion of said positioning button is placed onto an outer surface of said canopy and move by said magnet of said positioning button along said surface of said canopy, and by moving said positioning pole by a magnetic attraction to further motivate said first and second positioning ring.

2. An improved quasi-uniaxial solar trajectory tracking transit system according to claim 1, wherein said opening of said case comprises a circular groove around said flange for receiving said canopy, and said case has graduation marks of azimuth around an outer surface in said canopy.

3. An improved quasi-uniaxial solar trajectory tracking transit system according to claim 1, wherein said two sides of said case are connected to said axle of said first positioning ring having graduation marks of latitude.

4. An improved quasi-uniaxial solar trajectory tracking transit system according to claim 1, wherein said two sides of said outer flange of said first positioning ring connected to said axle of said second positioning ring comprises graduation marks of time.

5. An improved quasi-uniaxial solar trajectory tracking transit system according to claim 1, wherein a periphery of said groove of said second positioning ring comprises a graduation for said positioning pole to set dates.

6. An improved quasi-uniaxial solar trajectory tracking transit system according to claim 1, wherein said positioning button has a radius smaller than a radius of said canopy.

7. An improved quasi-uniaxial solar trajectory tracking transit system according to claim 1, wherein said positioning pole has a length slightly smaller than a radius of said canopy.

8. An improved quasi-uniaxial solar trajectory tracking transit system according to claim 1, wherein said magnet of said positioning button can be formed in a shape of a sphere, a hemisphere, a tube, a rectangle or other geometrical shape.

9. An improved quasi-uniaxial solar trajectory tracking transit system according to claim 1, wherein said magnet of said hollow pole can be formed in a shape of a cylinder, a cuboid or other geometrical shape.

10. An improved quasi-uniaxial solar trajectory tracking transit system according to claim 1, wherein said hollow pole comprises an inlaying tube comprising a magnet at a frontal end thereof.

11. An improved quasi-uniaxial solar trajectory tracking transit system according to claim 1, wherein said first positioning ring can be formed in a crossed semicircular shape.

* * * * *